United States Patent
Myohoji et al.

(10) Patent No.: US 9,623,897 B2
(45) Date of Patent: Apr. 18, 2017

(54) STEERING SYSTEM

(71) Applicant: JTEKT CORPORATION, Osaka-shi, Osaka (JP)

(72) Inventors: Yu Myohoji, Habikino (JP); Masayoshi Sakuda, Kashihara (JP); Atsumune Nagatani, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/080,956

(22) Filed: Mar. 25, 2016

(65) Prior Publication Data

US 2016/0288820 A1     Oct. 6, 2016

(30) Foreign Application Priority Data

Mar. 31, 2015 (JP) .................................. 2015-072430
Aug. 19, 2015 (JP) .................................. 2015-162227

(51) Int. Cl.
  *B62D 1/19* (2006.01)
  *B62D 1/185* (2006.01)
  *B62D 1/184* (2006.01)

(52) U.S. Cl.
  CPC ............. *B62D 1/195* (2013.01); *B62D 1/184* (2013.01); *B62D 1/185* (2013.01)

(58) Field of Classification Search
  CPC ......... B62D 1/195; B62D 1/185; B62D 1/184
  USPC .................... 280/775, 776; 74/492, 493, 495
  See application file for complete search history.

(56) References Cited

U.S. PATENT DOCUMENTS

| | | | |
|---|---|---|---|
| 2008/0202276 A1* | 8/2008 | Harris | B62D 1/187 74/493 |
| 2009/0282945 A1* | 11/2009 | Streng | B62D 1/184 74/493 |
| 2010/0300238 A1* | 12/2010 | Ridgway | B62D 1/184 74/493 |
| 2010/0301593 A1 | 12/2010 | Sakata | |
| 2011/0185839 A1 | 8/2011 | Inoue | |
| 2011/0210536 A1* | 9/2011 | Monteil | B62D 1/195 280/775 |
| 2015/0375770 A1* | 12/2015 | Buzzard | B62D 1/184 74/493 |

FOREIGN PATENT DOCUMENTS

JP    2010-254204 A    11/2010

OTHER PUBLICATIONS

Sep. 12, 2016 Search Report issued in European Patent Application No. 16162622.1.

* cited by examiner

*Primary Examiner* — Darlene P Condra
(74) *Attorney, Agent, or Firm* — Oliff PLC (57) ABSTRACT

When telescopic locking is released, a second tooth defining member operating in conjunction with rotation of a clamping shaft acts to separate second teeth of the second tooth defining member from first teeth arranged in a column axial direction. At this time, a second portion of the second tooth defining member on which the second teeth are formed is guided by a second guide mechanism in an orthogonal direction orthogonal to the column axial direction to release meshing engagement between the first teeth and the second teeth. A first portion of the second tooth defining member that is supported so as to be rotatable around a support is guided in a column axial direction by a first guide mechanism so as not to hinder operation of the second guide mechanism.

5 Claims, 10 Drawing Sheets

STEERING SYSTEM

INCORPORATION BY REFERENCE

The disclosure of Japanese Patent Applications No. 2015-072430 filed on Mar. 31, 2015 and No. 2015-162227 filed on Aug. 19, 2015 including the specification, drawings and abstract, is incorporated herein by reference in its entirety.

BACKGROUND OF THE INVENTION

1. Field of the Invention
The invention relates to a steering system.
2. Description of the Related Art
In a steering system in Japanese Patent Application Publication No. 2010-254204 (JP 2010-254204 A), a wavy recessed and protruding portion is formed on an outer periphery of an eccentric cam that rotates around a support shaft in conjunction with an operation of an adjustment lever. The wavy recessed and protruding portion is pressed against an upper surface of an inner column to achieve telescopic locking.

The inventors envisage that first teeth arranged on the inner column in an axial direction are brought into meshing engagement with second teeth that rotate around the support shaft and that the meshing engagement is released. The second teeth rotate in a circular-arc-like trajectory around the support shaft. Thus, when the meshing engagement with the first teeth is released, the second teeth are separated from the first teeth in a direction inclined with respect to a direction orthogonal to an aligning direction of the first teeth. This may hinder the second teeth from being separated from the first teeth, preventing easy release of the meshing engagement between the first teeth and the second teeth. As a result, during unlocking, the operation lever may feel heavy and may be difficult to operate, leading to degraded operability.

SUMMARY OF THE INVENTION

An object of the invention is to provide a steering system that facilitates operation of an operation lever.

In an aspect of the invention, a steering system includes a steering shaft that is configured to contract and extend in a column axial direction during telescopic adjustment, a column jacket including an outer jacket having a slit and a pair of clamped portions arranged on opposite sides of the slit and an inner jacket fitted in the outer jacket, the column jacket being configured to contract and extend in the column axial direction during telescopic adjustment, a clamping mechanism including a clamping shaft supported in clamping shaft through-holes in the clamped portions and an operation lever that rotates the clamping shaft, the clamping mechanism clamping the clamped portions via the clamping shaft so that the outer jacket holds the inner jacket at a predetermined position within a telescopic stroke range, and a tooth locking mechanism that brings first teeth into meshing engagement with second teeth to achieve telescopic locking during clamping by the clamping mechanism. The tooth locking mechanism includes a first tooth defining member having the first teeth such that the first teeth are arranged in the column axial direction and moving together with the inner jacket, a second tooth defining member including a first portion rotatably supported around a support and a second portion located away from the first portion and having the second teeth, an interlocking mechanism that interlocks motion of the second tooth defining member with rotation of the clamping shaft, a first guide mechanism that guides the first portion in the column axial direction, and a second guide mechanism that guides the second portion in an orthogonal direction orthogonal to the column axial direction while the first teeth and the second teeth are in a meshing engagement state.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 5A and 5B are schematic side views of the tooth locking mechanism, FIG. 5A depicts a meshing engagement state, and FIG. 5B depicts a meshing engagement released state;

FIGS. 9A and 9B are schematic plan views of a tooth locking mechanism in the third embodiment, depicting operations of a second tooth defining member and a structure supporting the second tooth defining member at the time of a secondary collision, FIG. 9A depicts a state before detachment, and FIG. 9B depicts a state after the detachment;

FIGS. 11A and 11B are schematic side views of the tooth locking mechanism in a meshing engagement released state in the fourth embodiment, FIG. 11A depicts an upper jacket located at a central position of a telescopic stroke range, and FIG. 11B depicts the upper jacket regulated to an end position of the telescopic stroke range;

FIGS. 14A and 14B are schematic side views of the tooth locking mechanism in the fifth embodiment, FIG. 14A depicts a meshing engagement state, and FIG. 14B depicts a meshing engagement released state.

DETAILED DESCRIPTION OF EMBODIMENTS

Figure 1:
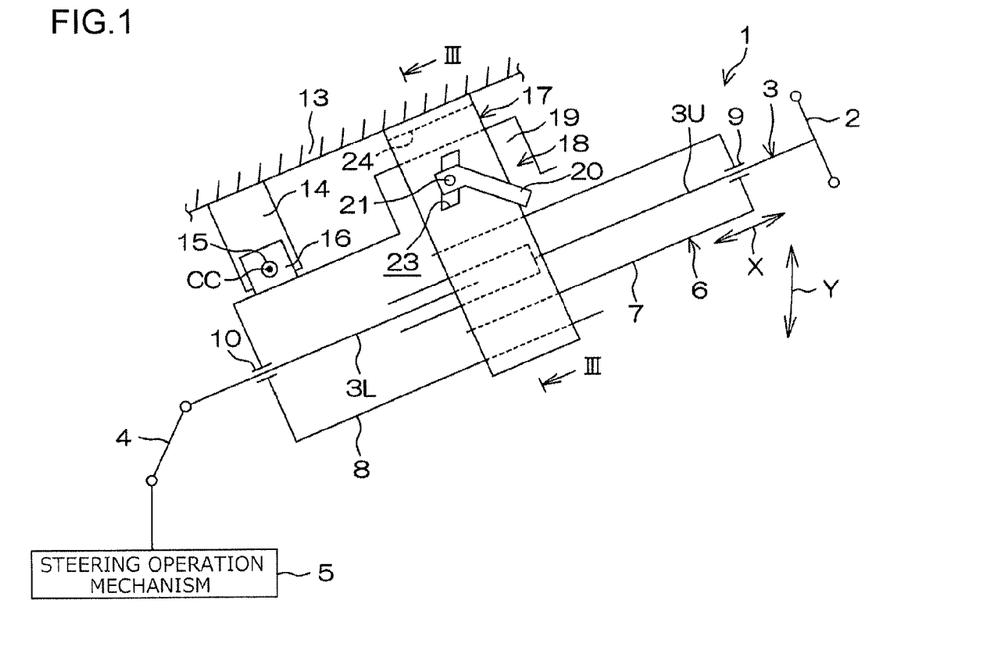
FIG. 1 is a schematic side view of a steering system in a first embodiment of the invention.

Embodiments of the invention will be described below in detail with reference to the attached drawings. FIG. 1 is a schematic side view of a steering system 1 according to a first embodiment of the invention. As seen in FIG. 1, the steering system 1 includes a steering shaft 3 and a steering operation mechanism 5. An end (axially upper end) of the steering shaft 3 is coupled to a steering member 2 such as a steering wheel.

The steering operation mechanism 5 is coupled to the steering shaft 3 via an intermediate shaft 4 and the like.

The steering operation mechanism 5 is, for example, a rack-and-pinion mechanism that turns steered wheels (not depicted in the drawings) in conjunction with steering of the steering member 2. Rotation of the steering member 2 is transmitted to the steering operation mechanism 5 via the steering shaft 3, the intermediate shaft 4, and the like. The rotation transmitted to the steering operation mechanism 5 is converted into axial movement of a rack shaft not depicted in the drawings. Consequently, the steered wheels are turned.

The steering shaft 3 has a tubular upper shaft 3U and a tubular lower shaft 3L that are fitted together by, for example, spline fitting or serration fitting so as to be slidable relative to each other. The upper shaft 3U is fitted to the lower shaft 3L by spline fitting or serration fitting so as to be slidable relative to the lower shaft 3L. The steering member 2 is coupled to an end of the upper shaft 3U. The steering shaft 3 can contract and extend in a column axial direction X. The steering system 1 includes a hollow column jacket 6 that supports the steering shaft 3 so as to make the steering shaft 3 rotatable. The column jacket 6 includes an upper jacket 7 and a lower jacket 8 that is a tubular outer jacket. The upper jacket 7 is a tubular inner jacket. The lower jacket 8 is a tubular outer jacket fitted over the upper jacket 7.

The steering shaft 3 is inserted into the column jacket 6 and rotatably supported by the column jacket 6 via a plurality of bearings 9 and 10. The upper jacket 7 is coupled to the upper shaft 3U via the bearing 9 so as to be movable in the column axial direction X in conjunction with the upper shaft 3U. The lower jacket 8 supports the lower shaft 3L via the bearing 10 so that the lower shaft 3L is rotatable. The upper jacket 7 moves in the column axial direction X with respect to the lower jacket 8. Consequently, the column jacket 6 can contract and extend in the column axial direction X along with the steering shaft 3.

The steering system 1 includes a fixed bracket 14, a tilt center shaft 15, and a column bracket 16. The fixed bracket 14 is fixed to a vehicle body 13. The tilt center shaft 15 is supported by the fixed bracket 14. The column bracket 16 is fixed to an outer periphery of the lower jacket 8 and rotatably supported by the tilt center shaft 15. The column jacket 6 and the steering shaft 3 can pivot (is tiltable) in a tilt direction Y using, as a support, a tilt center CC that is a central axis of the tilt center shaft 15.

The position of the steering member 2 can be adjusted by pivoting (tilting) the steering shaft 3 and the column jacket 6 around the tilt center CC (tilt adjustment). The position of the steering member 2 can be adjusted by contracting or extending the steering shaft 3 and the column jacket 6 in the column axial direction X (telescopic adjustment).

The steering system 1 includes a bracket 17 and a clamping mechanism 18.

Figure 2:
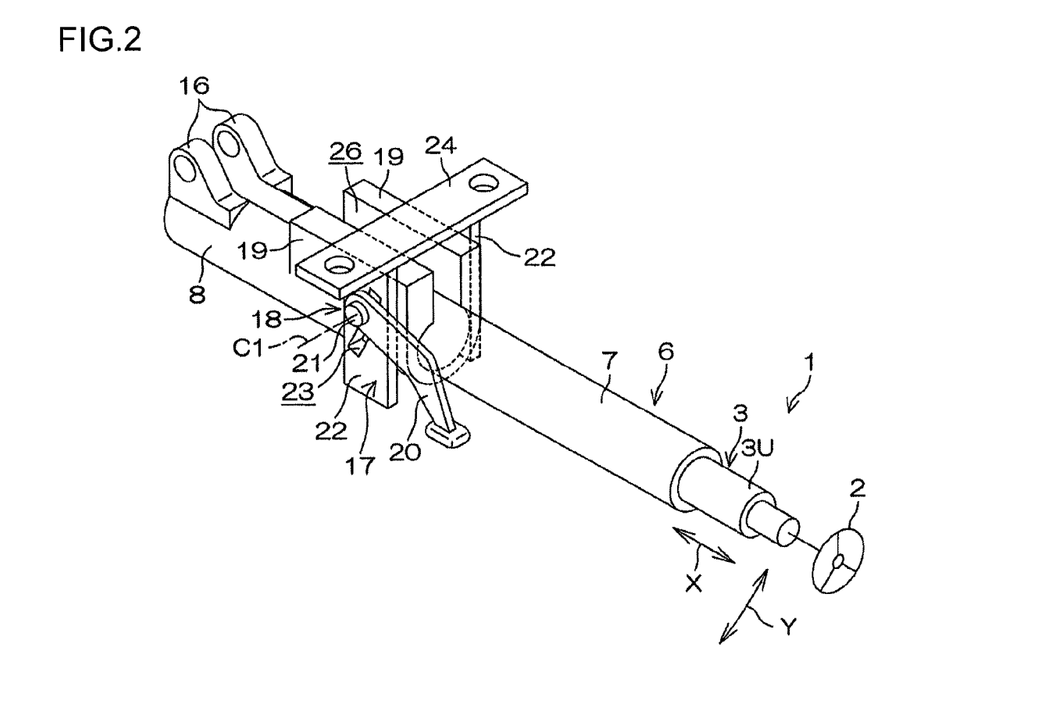
FIG. 2 is a schematic perspective view of the steering system in the first embodiment.

The bracket 17 includes an attachment plate 24 fixed to the vehicle body 13. The clamping mechanism 18 achieves tilt locking and telescopic locking by clamping a pair of clamped portions 19 integrated with an upper portion of the lower jacket 8 in the column axial direction X. As depicted in FIG. 1 and FIG. 2 that is a schematic perspective view of the steering system 1, the clamping mechanism 18 includes a clamping shaft 21 and an operation lever 20. The clamping shaft 21 is inserted through tilting slots 23 in the bracket 17 to clamp the clamped portions 19. The operation lever 20 is an operation member that rotates the clamping shaft 21. A central axis C1 of the clamping shaft 21 corresponds to a center of rotation of the operation lever 20.

Figure 3:
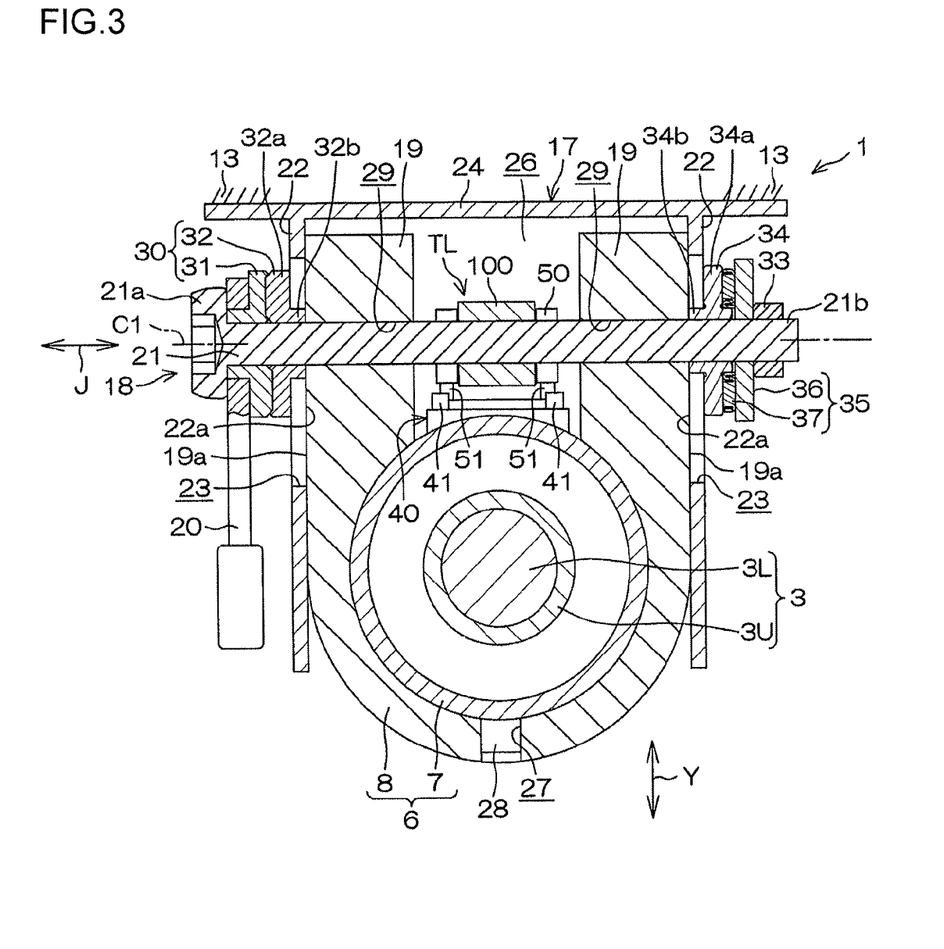
FIG. 3 is a sectional view of the steering system in the first embodiment corresponding to a sectional view taken along line in FIG. 1.

As depicted in FIG. 2, the lower jacket 8 includes a slit 26 extending downward from its upper end in the column axial direction X. The clamped portions 19 are arranged on opposite sides of the slit 26. Clamping the clamped portions 19 enables the lower jacket 8 to be elastically reduced in diameter. FIG. 3 is a sectional view taken along line in FIG. 1. As depicted in FIG. 3, the bracket 17 includes the attachment plate 24 and a pair of side plates 22. The attachment plate 24 is attached to the vehicle body 13. The side plates 22 extend downward from the opposite ends of the attachment plate 24 in the tilt direction Y.

The lower jacket 8 has a guide groove 27 extending in the column axial direction X. A guided protrusion 28 fixed to the upper jacket 7 is fitted in the guide groove 27. The guide groove 27 allows axial movement of the upper jacket 7 to be guided and regulates rotation of the upper jacket 7 with respect to the lower jacket 8. An end (not depicted in the drawings) of the guide groove 27 in the column axial direction X comes into abutting contact with the guided protrusion 28. This prevents the upper jacket 7 from slipping out from the lower jacket 8.

The clamped portions 19 of the lower jacket 8 are arranged between the side plates 22 and shaped like plates each extending along an inner surface 22a of the corresponding side plate 22. The inner surfaces 22a of the side plates 22 each face an outer surface 19a of the corresponding clamped portion 19. In each of the clamped portions 19 of the lower jacket 8, a first insertion hole 29 is formed which is a circular hole through which the clamping shaft 21 is inserted. During tilt adjustment, the clamping shaft 21, the lower jacket 8, the upper jacket 7, and the steering shaft 3 move together in the tilt direction Y.

The clamping shaft 21 is a bolt inserted through the tilting slots 23 in the side plates 22 of the bracket 17 and through the first insertion holes 29 in the clamped portions 19 of the lower jacket 8. A large-diameter head portion 21a provided at one end of the clamping shaft 21 is fixed to the operation lever 20 so as to be rotatable together with the operation lever 20. The clamping mechanism 18 is interposed between the head portion 21a of the clamping shaft 21 and one of the side plates 22. The clamping mechanism 18 further includes a force conversion mechanism 30 that converts an operation torque of the operation lever 20 into an axial force of the clamping shaft 21 (a clamping force needed to clamp the side plates 22).

The force conversion mechanism 30 includes a rotation cam 31 and a first clamping member 32. The rotation cam 31 is coupled to the operation lever 20 so as to rotatable together with the operation lever 20. Movement of the rotation cam 31 with respect to the clamping shaft 21 is regulated in a clamping shaft direction J that is a direction in which the clamping shaft 21 extends. The first clamping member 32 is a non-rotation cam that cam-engages with the rotation cam 31 to clamp a corresponding one of the side plates 22. The clamping mechanism 18 further includes a nut 33, a second clamping member 34, and an interposition member 35. The nut 33 is screw-threaded on a threaded portion 21b of the other end of the clamping shaft 21. The second clamping member 34 clamps the other side plate 22. The interposition member 35 is interposed between the second clamping member 34 and the nut 33. The interposition member 35 includes a washer 36 and a needle roller bearing 37.

The second clamping member 34 and the interposition member 35 are interposed between the nut 33 and the other side plate 22 of the bracket 17. The rotation cam 31, the first clamping member 32 (non-rotation cam), the second clamping member 34, and the interposition member 35 are supported by an outer periphery of the clamping shaft 21. The first clamping member 32 (non-rotation cam) and the second clamping member 34 have clamping plate portions 32a and 34a, respectively, that clamp the corresponding side plates 22, and boss portions 32b and 34b, respectively, that are fitted in the corresponding tilting slots 23. The fitting between the boss portions 32b and 34b and the corresponding tilting slots 23 regulates rotation of the clamping members 32 and 34.

The first clamping member 32 (non-rotation cam) and the second clamping member 34 are supported by the clamping shaft 21 so as to be movable in the clamping shaft direction J. In conjunction with rotation of the operation lever 20 in a locking direction, the rotation cam 31 rotates with respect to the first clamping member 32 (non-rotation cam). Consequently, the first clamping member 32 is moved in the clamping shaft direction J to clamp the side plates 22 of the bracket 17 between (the clamping plate portions 32a and 34a of) the clamping members 32 and 34.

Thus, the side plates 22 of the bracket 17 clamp the corresponding clamped portions 19 of the lower jacket 8. As a result, movement of the lower jacket 8 in the tilt direction Y is regulated to achieve tilt locking. Both clamped portions 19 are clamped to elastically reduce the lower jacket 8 in diameter to clamp the upper jacket 7. Consequently, movement of the upper jacket 7 in the column axial direction X is regulated to achieve telescopic locking. As described above, the clamping mechanism 18 achieves telescopic locking based on friction between the jackets 7 and 8.

Figure 4:
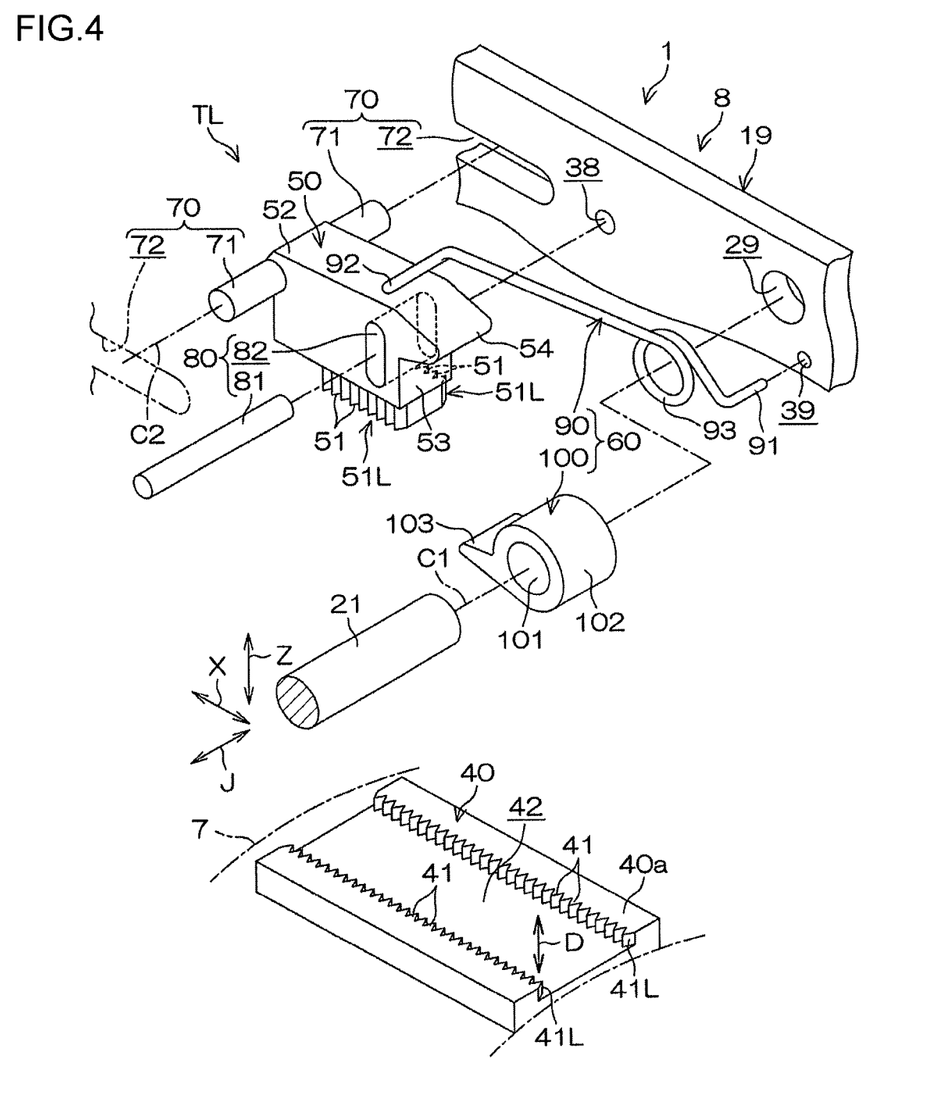
FIG. 4 is a schematic exploded perspective view of a tooth locking mechanism and a peripheral portion thereof in the first embodiment.
Figure 5A:
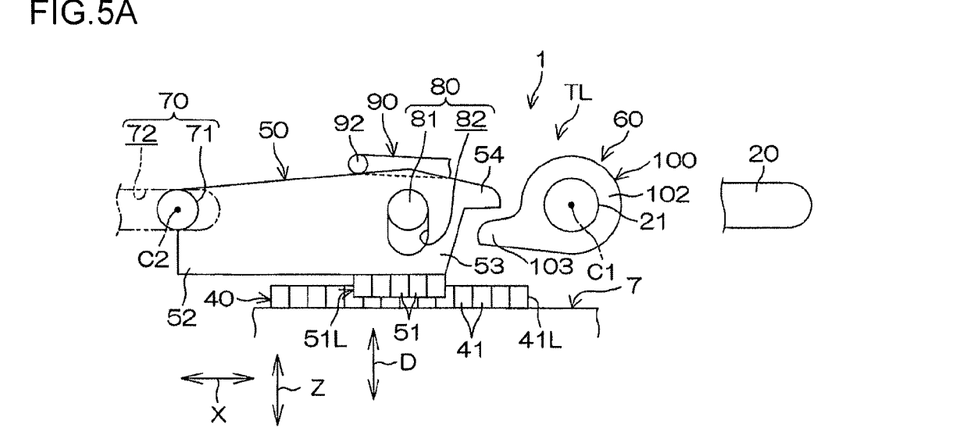

As depicted in FIG. 4, the steering system 1 further includes a tooth locking mechanism TL that brings teeth into meshing engagement with one another during clamping by the clamping mechanism 18 in order to stabilize initial restraint in a telescopic direction at the time of a secondary collision (in other words, in order to hold a telescopic position for the upper jacket 7 in an initial stage of the secondary collision). As seen in FIG. 4 and FIG. 5A that is a schematic side view, the tooth locking mechanism TL includes a first tooth defining member 40, a second tooth defining member 50, and an interlocking mechanism 60. The first tooth defining member 40 has first teeth 41 and moves together with the upper jacket 7 in the column axial direction X. The second tooth defining member 50 has second teeth 51 that come into meshing engagement with the first teeth 41 and is rotatably supported around a support. The interlocking mechanism 60 interlocks motion of the clamping shaft 21 with rotation of the second tooth defining member 50.

The second tooth defining member 50 includes a first portion 52 and a second portion 53. The first portion 52 is rotatably supported around the support. The second portion 53 is located away from the first portion 52 and has the second teeth 51. The tooth locking mechanism TL includes a first guide mechanism 70 and a second guide mechanism 80. The first guide mechanism 70 guides the first portion 52 in the column axial direction X. The second guide mechanism 80 guides the second portion 53 in an orthogonal direction Z orthogonal to the column axial direction X while the first teeth 41 and the second teeth 51 are in a meshing engagement state.

As depicted in FIG. 4, the first tooth defining member 40 is formed using a plate material extending longitudinally in the column axial direction X. The first tooth defining member 40 is fixed to an outer peripheral surface of the upper jacket 7 by welding or the like. A recessed groove 42 extending in the column axial direction X is formed in a surface 40a of the first tooth defining member 40. The recessed groove 42 has a pair of inner wall surfaces extending in the column axial direction X and facing each other in the clamping shaft direction J. On the inner wall surfaces, a pair of first tooth rows 41 L is formed such that each of the first tooth rows 41 L includes a plurality of first teeth 41 arranged in the column axial direction X.

Tooth tips of the first teeth 41 of one of the first tooth rows 41L face tooth tips of the first teeth 41 of the other first tooth row 41L in the clamping shaft direction J. A tooth trace direction D (corresponding to a tooth width direction) of the first teeth 41 extends in a depth direction of the recessed groove 42 so as to be orthogonal both to the column axial direction X and to the clamping shaft direction J. The first tooth defining member 40 may be fixed to an outer peripheral surface of the upper jacket 7 by bolts or the like not depicted in the drawings. The first tooth defining member 40 may be formed integrally with the upper jacket 7 using a single material.

The second tooth defining member 50 has a pair of second tooth rows 51 L formed on a surface of the second portion 53 that is closer to the first tooth defining member 40 such that a plurality of second teeth 51 is arranged in each of the second tooth rows 51L. As depicted in FIG. 4, tips of the second teeth 51 of the two second tooth rows 51 L face radially outward in the opposite directions. The second teeth 51 in each of the second tooth rows 51 L can come into meshing engagement with the first teeth 41 in the corresponding first tooth row 41 L in the tooth trace direction D.

The first tooth rows 41L are arranged on opposite sides in the clamping shaft direction J. The tooth trace direction D is orthogonal to the column axial direction X and to the clamping shaft direction J. This allows suppression of possible tooth jump between the second teeth 51 and the first teeth 41 at the time of the secondary collision. The first guide mechanism 70 includes a pair of first shafts 71 and a pair of guide holes 72. Each of the first shafts 71 protrudes laterally outward from the first portion 52 of the second tooth defining member 50. The first guide holes 72 are slots formed respectively in the clamped portions 19 of the lower jacket 8 and extending in the column axial direction X.

The first guide holes 72 allow the corresponding first shafts 71 to be inserted therethrough to support the first shafts 71 such that the first shafts 71 are slidable in the column axial direction X. The first shafts 71 have a central axis C2 as the above-described support. The first shafts 71 can be moved in the column axial direction X, while being parallel to the clamping shaft 21, by the guide through the first guide holes 72. The second guide mechanism 80 includes a second shaft 81 and a second guide hole 82. Opposite ends of the second shaft 81 are supported by support holes 38 in the clamped portions 19 of the lower jacket 8. The second guide hole 82 through which the second shaft 81 is inserted is a slot formed in the second tooth defining member 50 and extending in the orthogonal direction Z when the first teeth 41 and the second teeth 51 are in a meshing engagement state (see also FIG. 5A).

As depicted in FIG. 4 and FIG. 5A, the interlocking mechanism 60 includes a bias member 90 and a release member 100. The bias member 90 rotationally biases the second tooth defining member 50 toward a meshing engagement side (the side where the second teeth 51 come into meshing engagement with the first teeth 41) around the central axis C2 of the first shafts 71. The release member 100 drives the second tooth defining member 50 toward the meshing engagement released side against the biasing of the bias member 90. The bias member 90 is a torsion spring including a first end 91, a second end 92, and a coil portion 93. The first end 91 is locked in a locking hole 39 in one of the clamped portions 19 that serves as a locking portion. The second end 92 presses and engages with the second portion 53 on the opposite side of the second tooth defining member 50 from the second teeth 51. The coil portion 93 is wound around the clamping shaft 21 between the first end 91 and the second end 92.

The release member 100 includes an annular main body 102 and a release protrusion 103. The main body 102 has a fitting hole 101 (spline hole) in which the clamping shaft 21 is spline-fitted so as to be rotatable together with the main body 102. The release protrusion 103 is a release portion protruding outward from an outer periphery of the main body 102. In conjunction with rotation of the clamping shaft 21 in an unlocking direction, the release protrusion 103 comes into engagement with an engagement protrusion 54 provided on the second portion 53 of the second tooth defining member 50 and serving as an engagement portion. Consequently, the release protrusion 103 rotates the second tooth defining member 50 toward the meshing engagement released side against the biasing of the bias member 90.

Figure 5B:
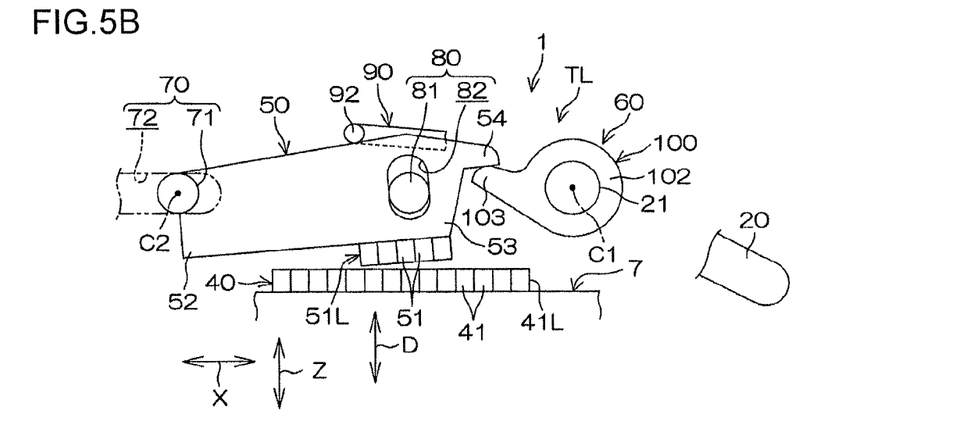

When the operation lever 20 is rotated in a locking direction (counterclockwise in FIG. 5B), the release member 100 is rotated counterclockwise along with the clamping shaft 21 from a state depicted in FIG. 5B to a state depicted in FIG. 5A. Consequently, the release protrusion 103 of the release member 100 is disengaged from the engagement protrusion 54 of the second tooth defining member 50. Thus, the bias member 90 rotationally drives the second tooth defining member 50 clockwise around the support (the central axis C2 of the first shafts 71). The second teeth 51 come into meshing engagement with the first teeth 41 in the tooth trace direction D (see FIG. 5A). This achieves telescopic locking based on tooth locking.

In contrast, when the operation lever 20 is rotated in the unlocking direction (clockwise in FIG. 5A), the release member 100 is rotated clockwise along with the clamping shaft 21 from the state depicted in FIG. 5A to the state depicted in FIG. 5B. Consequently, the release protrusion 103 of the release member 100 pushes up the engagement protrusion 54 of the second tooth defining member 50. Thus, the second tooth defining member 50 is rotationally driven counterclockwise around the support (the central axis C2 of the first shafts 71). The second teeth 51 are separated from the first teeth 41 along the tooth trace direction D to release the meshing engagement between the second teeth 51 and the first teeth 41 (see FIG. 5B). This releases the telescopic locking based on the tooth locking.

In the present embodiment, when, with the tooth locking mechanism TL in the meshing engagement state (telescopic locking) as depicted in FIG. 5A, the meshing engagement is released (the telescopic locking is released), the second tooth defining member 50, which rotates in conjunction with rotation of the clamping shaft 21 via the interlocking mechanism 60, acts to separate the second teeth 51 from the first teeth 41 arranged in the column axial direction X. At this time, the second portion 53 of the second tooth defining member 50, on which the second teeth 51 are formed, is guided by the second guide mechanism 80 in the orthogonal direction Z orthogonal to the column axial direction X. This facilitates release of the meshing engagement. Specifically, a moving trajectory of the second teeth 51 during meshing engagement release extends along the tooth trace direction D of the first teeth 41, which corresponds to the orthogonal direction Z orthogonal to the column axial direction X (the direction in which the first teeth 41 are arranged). Therefore, the meshing engagement of the second teeth 51 with the first teeth 41 can be easily released. Thus, the operation lever 20 is easily operated during unlocking, enhancing operability of the operation lever 20.

The first portion 52 of the second tooth defining member 50, which is rotatably supported around the support (the central axis C2 of the first shafts 71), is guided in the column axial direction X by the first guide mechanism 70. This allows the second guide mechanism 80 to smoothly guide the operation of the second portion 53 in the orthogonal direction Z. Also in this regard, the release of the meshing engagement is facilitated as much as possible, enhancing the operability of the operation lever 20 during unlocking.

In the second tooth defining member 50, the second guide mechanism 80 functions such that the second portion 53 provided with the second teeth 51 is guided in the orthogonal direction Z through the second guide hole 82, which is a slot extending in the orthogonal direction Z and through which the second shaft 81 is inserted. The arrangement position of the first shafts 71 and the arrangement position of the second shaft 81 are changed with respect to the arrangement position of the clamping shaft 21. This allows easy adjustment of the moving trajectory of the second teeth 51 followed when the second teeth 51 are separated from the first teeth 41.

The first guide mechanism 70 functions such that the first shafts 71, which have the central axis C2 as the support to support the second tooth defining member 50, is slidably guided in the column axial direction X through the first guide holes 72 formed in the lower jacket 8. Specifically, when the second teeth 51 of the second portion 53 are guided in the orthogonal direction Z by the second guide mechanism 80 from the meshing engagement state depicted in FIG. 5A to the meshing engagement released state depicted in FIG. 5B, the first shafts 71 of the first portion 52 slide through the first guide holes 72 formed in the lower jacket 8 toward the clamping shaft 21 in the column axial direction X (rightward in FIG. 5B).

Figure 6:
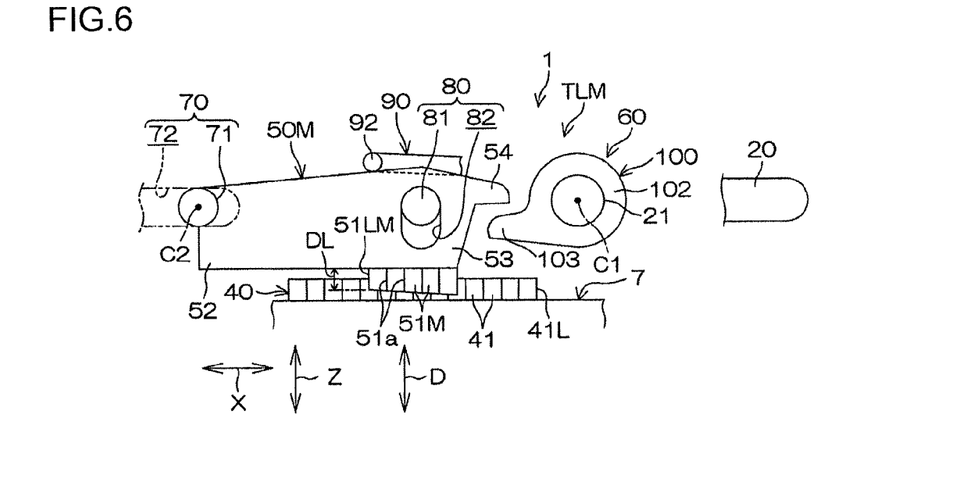
FIG. 6 is a schematic side view of a tooth locking mechanism in a second embodiment of the invention.

In the interlocking mechanism 60, when the release member 100 drives the second portion 53 of the second tooth defining member 50 toward the meshing engagement released side, the second guide mechanism 80 associated with the second portion 53 guides the second portion 53 in the orthogonal direction Z. Specifically, the release protrusion 103 of the release member 100 is brought into abutting contact with the engagement protrusion 54 of the second portion 53 of the second tooth defining member 50. Consequently, the second portion 53 is driven toward the meshing engagement released side, so that driving of the second portion 53 by the release member 100 is restrained from hindering the operation of the second guide mechanism 80. FIG. 6 is a schematic side view of a tooth locking mechanism TLM in a second embodiment of the invention.

The second embodiment in FIG. 6 is different from the first embodiment in

FIG. 5A mainly in the following respect. Second tooth rows 51 LM of a second tooth defining member 50M are inclined in a side view. A length DL (corresponding to a tooth width) of a tooth trace 51 a of each of second teeth 51 M increases toward a tip of the second tooth defining member 50M (opposite side from the first shafts 71). The same components of the second embodiment in FIG. 6 as the corresponding components of the first embodiment in FIG. 5A are denoted by the same reference numerals as those of the components of the first embodiment in FIG. 5A.

Figure 7:
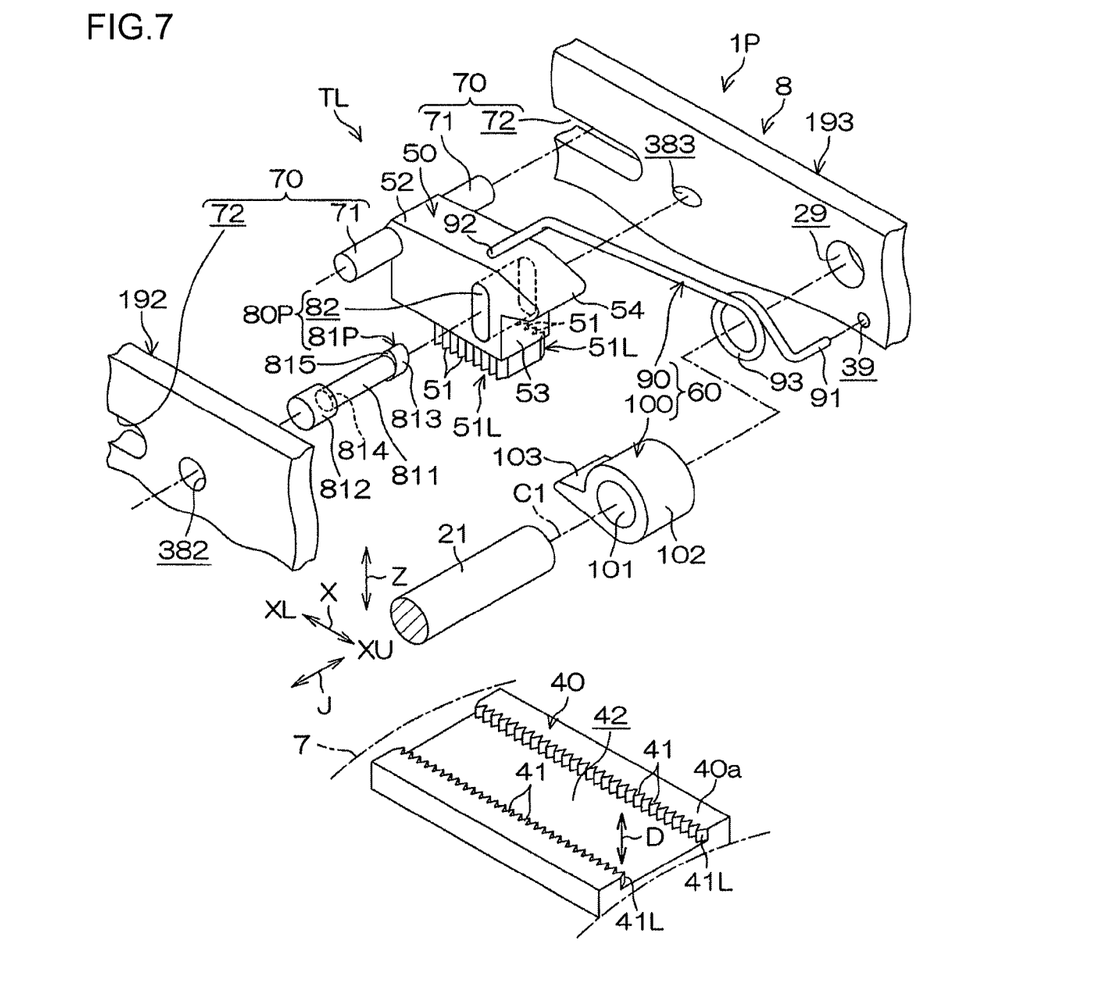
FIG. 7 is a schematic exploded perspective view of a tooth locking mechanism and a peripheral portion thereof in a steering system in a third embodiment of the invention.

In the present embodiment, when a plurality of second teeth 51M in each of the second tooth rows 51LM is separated from the corresponding first teeth 41, the meshing engagement is released such that the second teeth 51M are sequentially separated starting with the second tooth 51M located closest to the first shafts 71. This facilitates the separation, enhancing separation performance. On the other hand, during meshing engagement, the second teeth 51M in each of the second tooth rows 51LM are brought into meshing engagement with the corresponding first teeth 41 starting with the second tooth 51M located at the tip of the second tooth row 51LM. This facilitates the meshing engagement, enhancing meshing engagement performance. FIG. 7 is a schematic exploded perspective view of a tooth locking mechanism TL and a peripheral portion thereof in a steering system 1P in a third embodiment of the invention.

The steering system 1P in the third embodiment in FIG. 7 is different from the steering system 1 in FIG. 4 mainly in the following respect. A second guide mechanism 80P includes a second shaft 81P that is made of resin and sheared under an impact load imposed via the second tooth defining member 50 at the time of the secondary collision. The second shaft 81P includes a first portion 811, a pair of second portions 812, 813, and stepped portions 814, 815 formed between the first portion 811 and the second portion 812 and between the first portion 811 and the second portion 813, respectively.

Figure 8A:
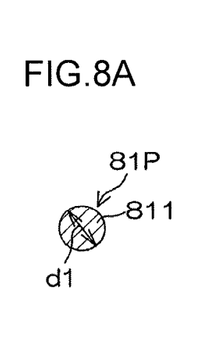
FIGS. 8A, 8B, and 8C are sectional views of a first portion, a second portion, and another second portion that are included in a second shaft in the third embodiment.
Figures 8B, 8C:
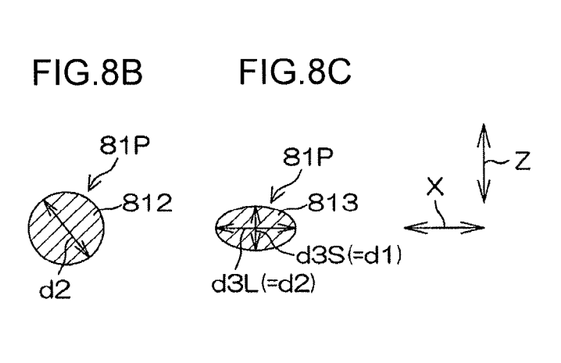

The first portion 811 and the second portion 812 are cylindrically formed. The second portion 813 is formed to have an elliptic or oval section. As depicted in FIG. 8A and FIG. 8B, a diameter d1 of (the sectional circle of) the first portion 811 is set smaller than a diameter d2 of (the sectional circle of) the second portion 811 As depicted in FIG. 8C, a major diameter d3L of the sectional ellipse or oval of the second portion 813 is set equal to the diameter d2 of the second portion 812 (d3L=d2). A minor diameter d3S of the sectional ellipse or oval of the second portion 813 is set equal to the diameter d1 of the first portion 811 (d3S=d1).

Figure 9A:
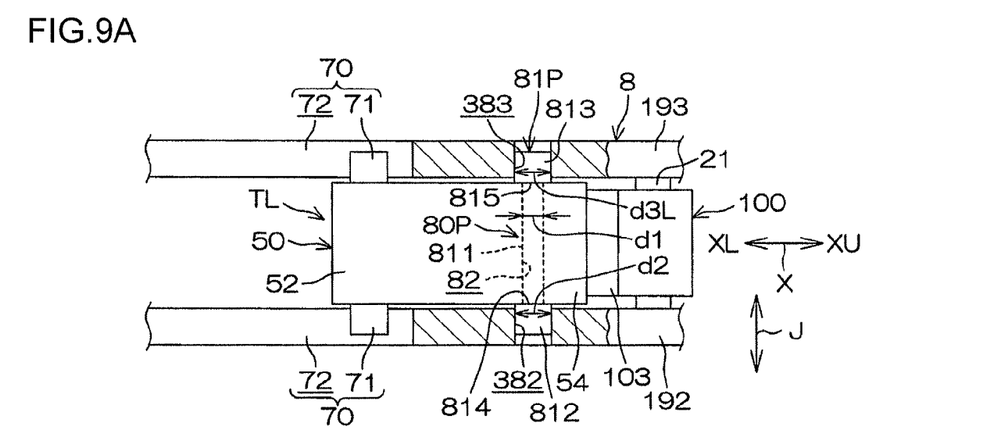

As depicted in FIG. 7 and FIG. 9A, the first portion 811 is inserted through the second guide hole 82 in the second tooth defining member 50. The second guide hole 82 is a slot extending in the orthogonal direction Z. The second portions 812 and 813 are fitted in and supported by support holes 382 and 383, respectively, formed in corresponding clamped portions 192 and 193 of the lower jacket 8. The support hole 382 in the clamped portion 192 is a circular hole. The support hole 383 in the clamped portion 193 is formed to be a slot having an elliptic or oval section and extending in the column axial direction X. The sectional shape of the support hole 383 matches the sectional shape of the second portion 813.

A procedure is as follows in which the second portion 813 of the second shaft 81 P is passed through the second guide hole 82 in the second tooth defining member 50 and assembled into the support hole 383. First, as depicted in FIG. 7, the second portion 813 is inserted through the second guide hole 82 such that a major-axis direction of the second portion 813 coincides with a longitudinal direction of the second guide hole 82 (corresponding to the orthogonal direction Z).

Although not depicted in the drawings, after the second portion 813 passes through the second guide hole 82 (that is, with the first portion 811 inserted through the second guide hole 82), the second shaft 81P is displaced by 90° around a central axis of the second shaft 81P. Consequently, the major-axis direction of the second portion 813 coincides with the column axial direction X. In this state, the second portion 813 is inserted into the support hole 383.

In an assembled state depicted in FIG. 9A, a sectional diameter (corresponding to the diameter d1) of the first portion 811 in the column axial direction X is smaller than a sectional diameter (corresponding to the diameter d2) of the second portion 812 in the column axial direction X and a sectional diameter (corresponding to the diameter d3L) of the second portion 813 in the column axial direction X (d1<d2; d1<d3L). The same components of the second embodiment in FIG. 7 as the corresponding components of the first embodiment in FIG. 4 are denoted by the same reference numerals as those of the components of the first embodiment in FIG. 4.

Figure 9B:
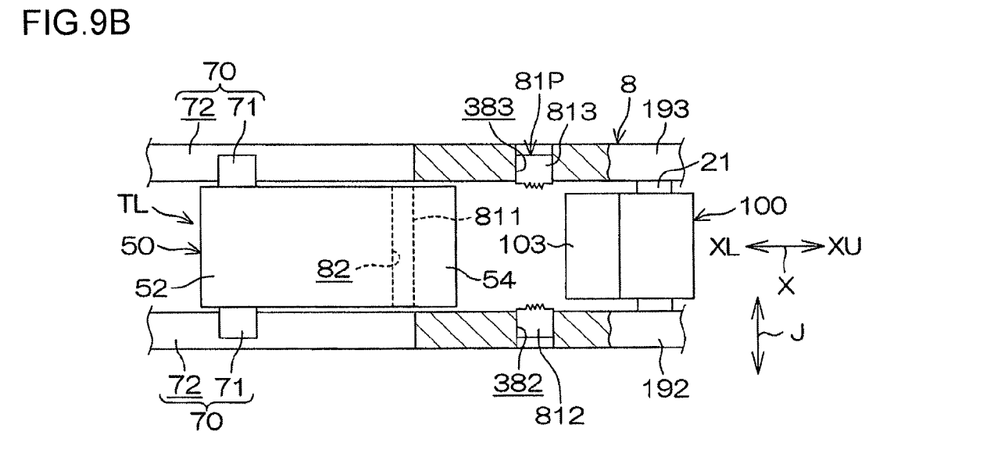

In the present embodiment, at the time of the secondary collision, when the upper jacket 7 moves toward a lower side XL in the column axial direction X, an impact load is imposed on the second tooth defining member 50 through the first tooth defining member 40, which moves together with the upper jacket 7. Therefore, in the second shaft 81P with the second portions 812, 813 supported by the clamped portions 192, 193 of the lower jacket 8, an impact load is imposed on the first portion 811 through the second tooth defining member 50. Thus, the second shaft 81P is sheared as depicted in FIG. 9B.

For the sectional diameter in the column axial direction X, the sectional diameter (diameter d1) of the first portion 811 inserted through the second guide hole 82 in the second tooth defining member 50 is smaller than the sectional diameters (the diameter d2, the major diameter d3L) of the second portions 812, 813 connected to the opposite ends of the first portion 811 via the stepped portions 814, 815. Thus, at the time of the secondary collision, the opposite ends of the first portion 811 are simultaneously sheared to allow a stable shearing load to be exerted.

Figure 10:
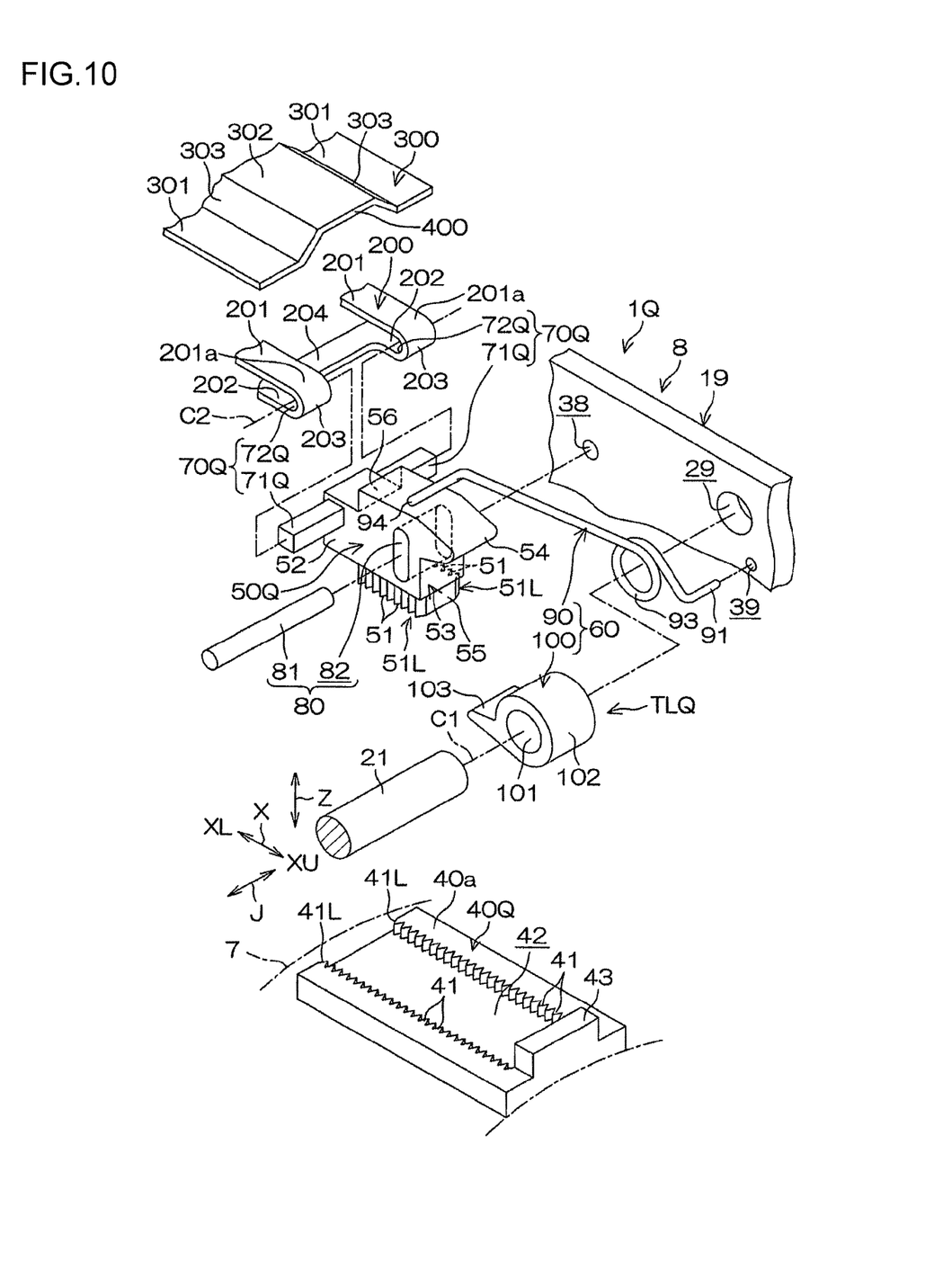
FIG. 10 is a schematic exploded perspective view of a tooth locking mechanism and a peripheral portion thereof in a fourth embodiment of the invention.

In other words, stress concentration is enhanced at the pair of portions of the second shaft 81 P (at the opposite ends of the first portion 811) at which the sectional diameter is changed and reduced, to allow the pair of portions to be reliably sheared. Thus, a stable shearing load can be exerted. The sectional shape of the first portion 811, which is sheared at the time of the secondary collision, is not limited to a circle but may be an ellipse or a rectangle or any other polygon. The second portion 812 may be different from the second portion 813 in the sectional diameter in the column axial direction X. FIG. 10 is a schematic exploded perspective view of a tooth locking mechanism TLQ and a peripheral portion thereof in a steering system 1Q in a fourth embodiment of the invention.

In the steering system 1Q, the second shaft 81 of the second guide mechanism 80 is made of resin so as to be sheared by an impact load imposed via a second tooth defining member 50Q at the time of the secondary collision. The steering system 1Q includes an energy absorption member 200 and a guide member 300. At the time of the secondary collision, the energy absorption member 200 is deformed to absorb impact energy. At the time of the secondary collision, the guide member 300 guides deformation of the energy absorption member 200 and also guides movement of the second tooth defining member 50Q.

The energy absorption member 200 includes a pair of first plate portions 201, a pair of second plate portions 202, and a coupling portion 204. Each of the first plate portions 201 is fixed to the lower jacket 8 at one end of the first plate portion 201 not depicted in the drawings. Each of the second plate portions 202 is formed by folding back the corresponding first plate portion 201 at another end 201a thereof to form a fold-back portion 203. The coupling portion 204 couples the second plate portions 202 together. First shafts 71Q protruding laterally outward in the opposite directions from the first portion 52 of the second tooth defining member 50Q are inserted through first guide holes 72Q each of which is defined between the first plate portion 201 and the second plate portion 202 corresponding to the first plate portion 201 and each of which extends, in a groove form, toward the lower side XL in the column axial direction X. Each of the first shafts 71 Q and the corresponding first guide hole 72Q form a first guide mechanism 70Q. At time of the secondary collision, the first shafts 71Q are guided toward the lower side XL in the column axial direction X through the respective first guide holes 72Q.

The first shafts 71 may have, for example, a rectangular sectional shape with any of the corners thereof chamfered or an angled sectional shape. At the time of the secondary collision, the first portion 52 of the second tooth defining member 50Q, which moves together with the upper jacket 7 and the first tooth defining member 40Q, presses and moves the coupling portion 204 of the energy absorption member 200 toward the lower side XL in the column axial direction X. Thus, in the energy absorption member 200, the first plate portions 201 and the second plate portions 202 are elastically deformed such that the fold-back portions 203 move toward the lower side XL in the column axial direction X, absorbing impact energy.

The guide member 300 is fixed to the lower jacket 8. The guide member 300 includes a pair of first guide portions 301, a second guide portion 302, and a pair of connection portions 303. Between each of the first guide portions 301 and an outer peripheral surface (not depicted in the drawings) of the lower jacket 8, the corresponding first plate portion 201 and second plate portion 202 of the energy absorption member 200 are interposed. The first guide portions 301 function to regulate radially outward deformation of the energy absorption member 200 (particularly the first plate portions 201) with respect to the steering shaft 3. This allows deformation of the energy absorption member 200 to be guided.

The second guide portion 302 is interposed between the first guide portions 301. The second guide portion 302 is connected to each of the first guide portions 301 via the corresponding connection portion 303. At the time of the secondary collision, a part of the second tooth defining member 50Q that faces the second guide portion 302 is guided toward the lower side XL in the column axial direction X by the second guide portion 302. The steering system 1Q has a function to regulate an end position of the telescopic stroke range of the upper jacket 7 (the position where the upper jacket 7 is maximally contracted). The function will be described below.

An engagement member 43 integrated with the first tooth defining member 40Q is provided to serve as an integral moving member moving together with the upper jacket 7 (inner jacket) in the column axial direction X. A stopper portion 400 serving as a stopper member is provided at an end of the second guide portion 302 on an upper side XU in the column axial direction X. The stopper portion 400 regulates movement of the engagement member 43 (integral moving member) via the second tooth defining member 50Q during telescopic adjustment. Thus, the above-described end position of the telescopic stroke range is regulated.

Figure 11A:
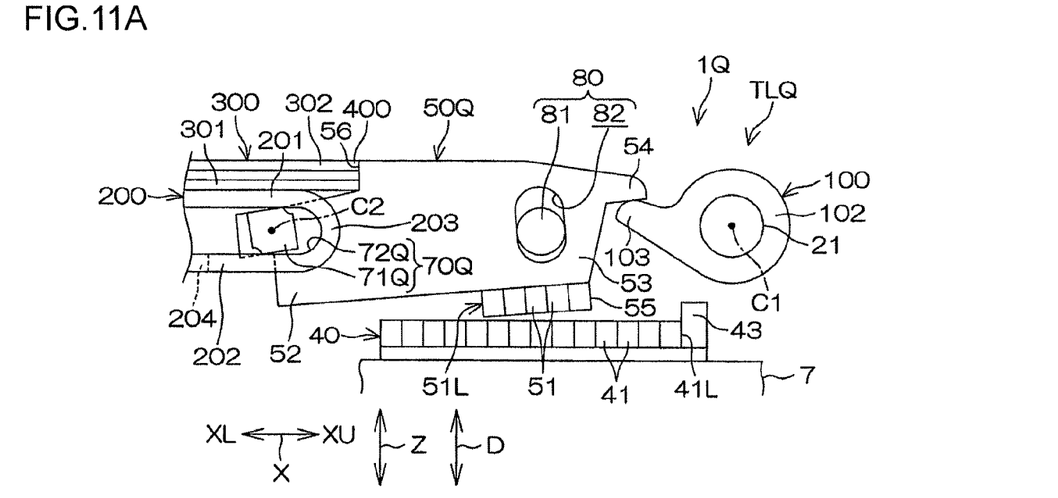
Figure 11B:
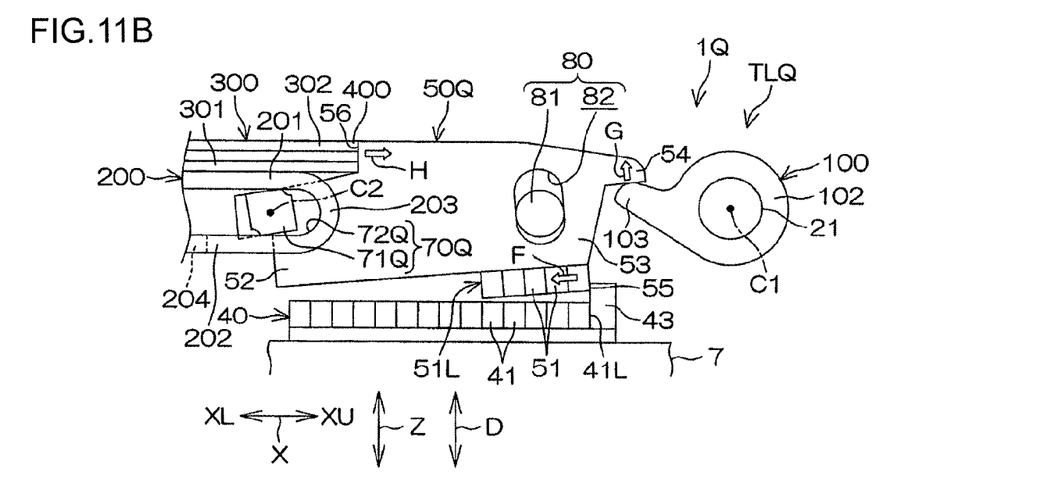

Specifically, as depicted in FIG. 11B, the second tooth defining member 50Q includes a first abutting contact portion 55 and a second abutting contact portion 56. The first abutting contact portion 55 comes into abutting contact with the engagement member 43 (integral moving member) when the above-described end position of the telescopic stroke range is regulated. The second abutting contact portion 56 comes into abutting contact with the stopper portion 400. The second tooth defining member 50Q is rotationally displaced around the central axis C2 of the first shafts 71Q. Consequently, when the tooth locking mechanism TLQ is in a meshing engagement released state as depicted in FIG. 11A, the second abutting contact portion 56 is displaced to a position where the second abutting contact portion 56 faces the stopper portion 400 in the column axial direction X.

Figure 12:
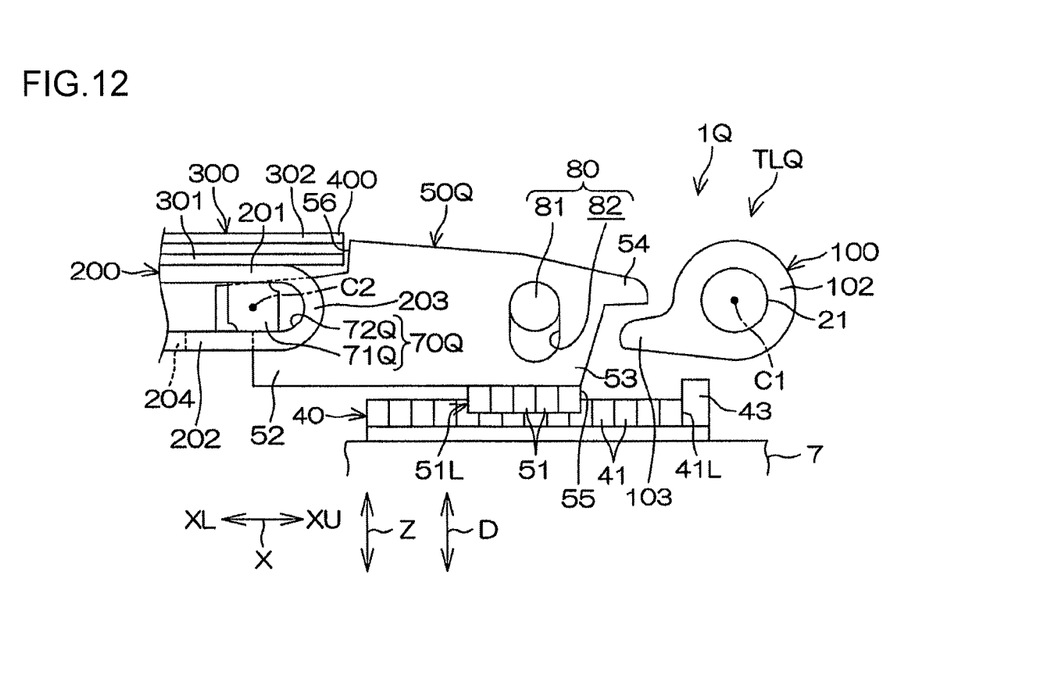
FIG. 12 is a schematic side view of the tooth locking mechanism in the meshing engagement state in the fourth embodiment.

When the tooth locking mechanism TLQ is in the meshing engagement state as depicted in FIG. 12, the second abutting contact portion 56 is displaced to a position where the second abutting contact portion 56 does not face the stopper portion 400 in the column axial direction X. Thus, the stopper portion 400, which regulates the telescopic stroke range, does not inhibit movement of the second tooth defining member 50Q at the time of the secondary collision. In the present embodiment, when the end position of the telescopic stroke range is regulated during telescopic adjustment, the stopper portion 400 is subjected, via the second abutting contact portion 56, to an abutting contact load resulting from abutting contact of the engagement member 43 (integral moving member) with the first abutting contact portion 55 of the second tooth defining member 50. Thus, a load imposed on the second shaft 81 during telescopic adjustment is kept low to suppress possible degradation of the second shaft 81. At the time of the secondary collision, as stable a shearing load as possible can be exerted on the second shaft 81.

As depicted in FIG. 11B, when the end position of the telescopic stroke range is regulated, a plurality of loads (external forces) imposed on the second tooth defining member 50Q is preferably generally balanced so as to inhibit occurrence of a possible rotational moment around the central axis C2 of the first shafts 71Q. The plurality of loads includes a first load F, a second load G, and a third load H. The first load F is generated when the engagement member 43 presses the first abutting contact portion 55 toward the lower side XL in the column axial direction X. The second load G is generated when the release protrusion 103 presses the engagement protrusion 54. The third load H is generated when the stopper portion 400 presses the second abutting contact portion 56 toward the upper side XU in the column axial direction X.

As long as the central axis C2 of the first shafts 71 is located on the lower side XL with respect to the engagement member 43 in the column axial direction X, the first load F is prevented from generating a moment around the central axis C2. In this case, the adverse effect of an impact made on the first abutting contact portion 55 by the engagement member 43 can be preferably suppressed. To keep the load imposed on the second shaft 81 low, the second shaft 81 is preferably separated from longitudinal ends of the second guide hole 82 when the end position of the telescopic stroke range is regulated.

Figure 13:
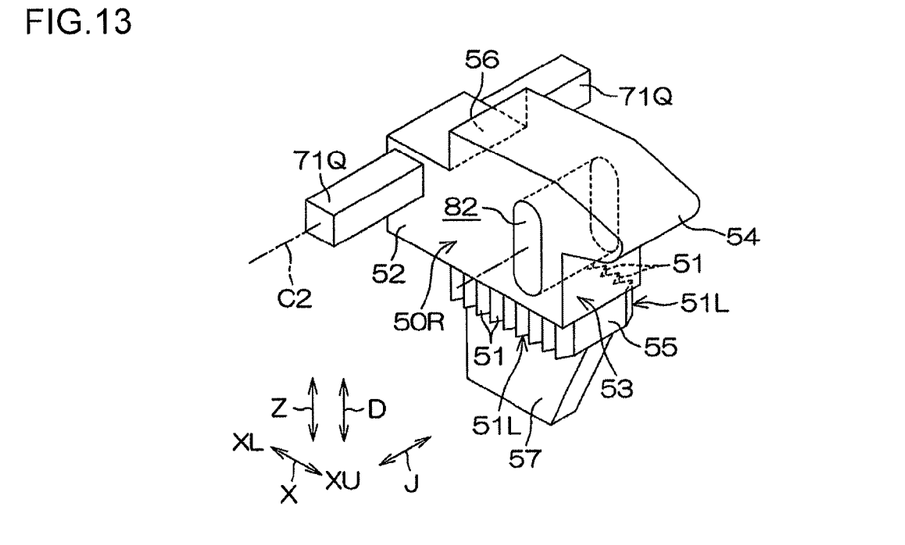
FIG. 13 is a perspective view of a first tooth defining member in a fifth embodiment of the invention.
Figure 14A:
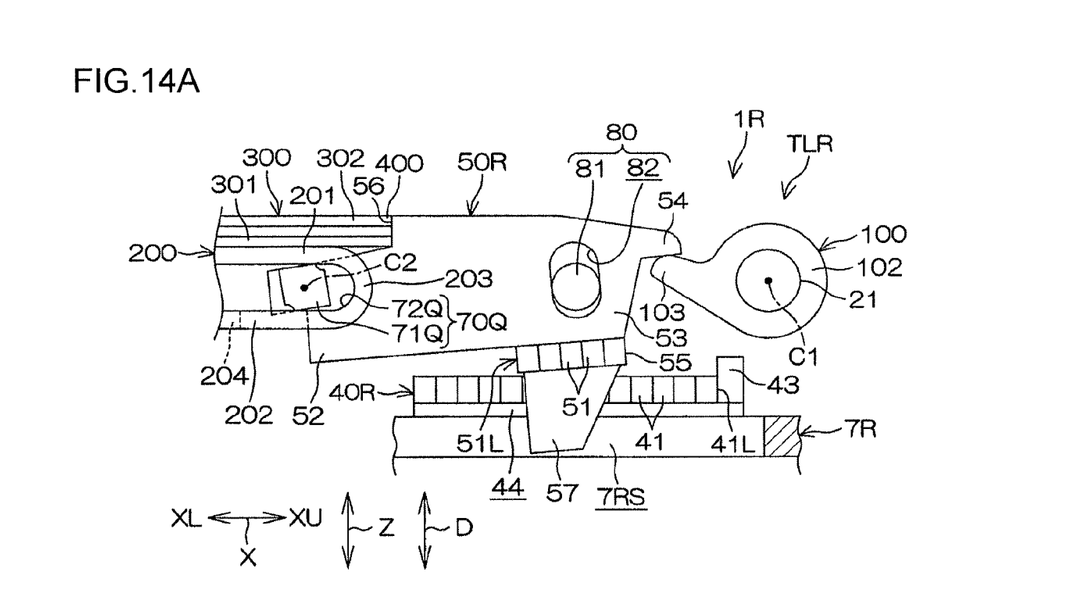
Figure 14B:
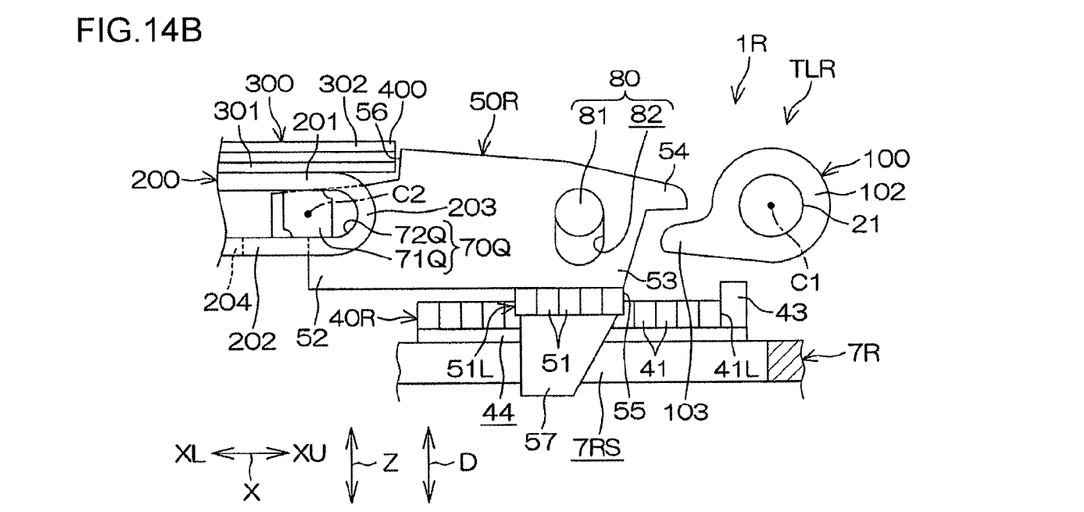

The stopper portion 400 may be configured as a separate member (stopper member) independent of the guide member 300 and be fixed to the lower jacket 8. The engagement member 43 (integral moving member) may be configured as a separate member independent of the first tooth defining member 40Q and be fixed to the upper jacket 7. FIG. 13 is a schematic perspective view of a second tooth defining member 50 R in a fifth embodiment of the invention. FIG. 14A and FIG. 14B are schematic side views depicting a meshing engagement released state and a meshing engagement state, respectively, of a tooth locking mechanism TLR in a steering system 1R in a fifth embodiment.

The steering system 1R in the fifth embodiment in FIG. 13 and FIGS. 14A and 14B is different from the steering system 1Q in the fourth embodiment in FIG. 11 and FIGS. 12A and 12B mainly in the following respect. A second tooth defining member 50R has a protrusion 57 formed on a surface thereof closer to the upper jacket 7R. The protrusion 57 is arranged between the second tooth rows 51L. The protrusion 57 is inserted through an insertion groove 44 formed in a first tooth defining member 40R so as to be movable in the axial direction X. The protrusion 57 is engaged with an engagement groove 7RS formed in an upper jacket 7R so as to be movable in the axial direction X. Both in the meshing engagement state (locking state) and in the meshing engagement released state (unlocking state), the protrusion 57 is engaged with the engagement groove 7RS.

The engagement of the protrusion 57 with the engagement groove 7RS restrains the second tooth defining member 50 from moving in a direction parallel to the central axis C2 serving as the support. This restrains possible backlash of the second tooth defining member 50R in the direction parallel to the central axis C2. This suppresses inappropriate meshing engagement between the second teeth 51 of the second tooth defining member 50R and the first teeth 41 of the first tooth defining member 40R.

The engagement groove 7RS may be a groove that penetrates the upper jacket 7R or a groove that does not penetrate the upper jacket 7R. The insertion groove 44 in the first tooth defining member 40R may function as an engagement groove that restrains the second tooth defining member 50R from moving in a direction parallel to the central axis C2. The invention is not limited to the above-described embodiments. For example, a member supported by the lower jacket 8 (not depicted in the drawings) may be provided with the first guide holes 72 of the first guide mechanism 70 through which the first shafts 71 of the first guide mechanism 70 are guided.

The tooth trace direction D of the first teeth 41 and the second teeth 51 may be parallel to the clamping shaft direction J. The first teeth 41 may be brought into meshing engagement with the second teeth 51 and released from the second teeth 51 in a tooth depth direction. The single second tooth 51 may be provided in association with each of the first tooth rows 41L. The clamping mechanism 18, the slit 26, and the tooth locking mechanism TL, TLM, TLQ, and TLR may be arranged below the upper jacket 7 in the tilt direction Y.

The second shaft 81 of the second guide mechanism 80 may be arranged above the clamping shaft 21 in the column axial direction X. The first shafts 71 of the first guide mechanism 70 may be arranged above the second shaft 81 in the column axial direction X. In the second guide mechanism 80, the second shaft 81 may be integrated with the second portion 53 of the second tooth defining member 50, and the second guide hole 82 may be formed in the lower jacket 8.

In the first guide mechanism 70, the first shafts 71 may be provided on the lower jacket 8 or a member supported by the lower jacket 8. The first guide holes 72 may be integrally formed in the first portion 52 of the second tooth defining member 50. The steering system 1 is not limited to the manual type steering system but may be an electric power steering system that applies mechanical power of an electric motor to the steering shaft 3 to assist steering. In addition, various changes may be made to the invention within the scope of the invention in the claims.

What is claimed is:

1. A steering system comprising:
    a steering shaft that is configured to contract and extend in a column axial direction during telescopic adjustment;
    a column jacket including an outer jacket having a slit and a pair of clamped portions arranged on opposite sides of the slit and an inner jacket fitted in the outer jacket, the column jacket being configured to contract and extend in the column axial direction during telescopic adjustment;
    a clamping mechanism including a clamping shaft supported in clamping shaft through-holes in the clamped portions and an operation lever that rotates the clamping shaft, the clamping mechanism clamping the clamped portions via the clamping shaft so that the outer jacket holds the inner jacket at a predetermined position within a telescopic stroke range; and
    a tooth locking mechanism that brings first teeth into meshing engagement with second teeth to achieve telescopic locking during clamping by the clamping mechanism, wherein
    the tooth locking mechanism includes:
        a first tooth defining member having the first teeth such that the first teeth are arranged in the column axial direction and moving together with the inner jacket;
        a second tooth defining member including a first portion rotatably supported around a support and a second portion located away from the first portion and having the second teeth;
        an interlocking mechanism that interlocks motion of the second tooth defining member with rotation of the clamping shaft;
        a first guide mechanism that guides the first portion in the column axial direction, and
        a second guide mechanism that guides the second portion in an orthogonal direction orthogonal to the column axial direction while the first teeth and the second teeth are in a meshing engagement state.

2. The steering system according to claim 1, wherein the first guide mechanism includes a first guide hole that is a slot formed in the outer jacket or in a member supported by the outer jacket, the slot extending in the column axial direction, and a first shaft having a central axis as the support and inserted through the first guide hole to support the second tooth defining member.

3. The steering system according to claim 1, wherein the second guide mechanism includes a second shaft supported by the outer jacket and a second guide hole that is a slot formed in the second tooth defining member and extending in the orthogonal direction when the first teeth and the second teeth are in the meshing engagement state.

4. The steering system according to claim 3, wherein the second shaft includes a first portion inserted through the second guide hole in the second tooth defining member and sheared by an impact load imposed via the second tooth defining member at a time of a secondary collision, and a pair of second portions supported by corresponding support holes formed in the respective clamped portions and connected via stepped portions to opposite ends of the first portion in an axial direction of the second shaft, and the first portion of the second shaft is smaller than each of the second portions of the second shaft in a sectional diameter with respect to the column axial direction.

5. The steering system according to claim 3, further comprising an integral moving member moving together with the inner jacket in the column axial direction and a stopper member that regulates an end position of the telescopic stroke range by regulating movement of the integral moving member via the second tooth defining member during telescopic adjustment, wherein
- the second tooth defining member includes a first abutting contact portion that comes into abutting contact with the integral moving member when the end position of the telescopic stroke range is regulated and a second abutting contact portion that comes into abutting contact with the stopper member when the end position of the telescopic stroke range is regulated, and
- the second shaft is configured to be sheared by an impact load imposed via the second tooth defining member at the time of the secondary collision.

* * * * *